US012492812B2

(12) United States Patent
Miyagi et al.

(10) Patent No.: US 12,492,812 B2
(45) Date of Patent: Dec. 9, 2025

(54) REUSABLE WAX CANDLE HOLDER AND METHODS

(71) Applicant: YUNO LLC, Lehi, UT (US)

(72) Inventors: Jonah Miyagi, Lehi, UT (US); Haruyoshi Miyagi, Lehi, UT (US)

( * ) Notice: Subject to any disclaimer, the term of this patent is extended or adjusted under 35 U.S.C. 154(b) by 358 days.

(21) Appl. No.: 18/173,835

(22) Filed: Feb. 24, 2023

(65) Prior Publication Data

US 2023/0194078 A1 Jun. 22, 2023

Related U.S. Application Data

(63) Continuation-in-part of application No. 17/579,588, filed on Jan. 19, 2022, now Pat. No. 11,802,690.

(60) Provisional application No. 63/139,303, filed on Jan. 19, 2021.

(51) Int. Cl.
*F21V 35/00* (2006.01)

(52) U.S. Cl.
CPC .................................. *F21V 35/003* (2013.01)

(58) Field of Classification Search
CPC .................................. F21V 35/00; F23D 3/16
USPC ......................... 431/291, 288, 295; 215/21.1
See application file for complete search history.

(56) References Cited

U.S. PATENT DOCUMENTS

| | | | |
|---|---|---|---|
| 370,562 A | 9/1887 | Schmitt | |
| 816,790 A | 4/1906 | Genovese | |
| 1,320,109 A | 10/1919 | Wooster | |
| 1,344,446 A | 6/1920 | Engman | |
| 2,137,701 A | 11/1938 | Replogle | |
| 2,291,067 A | 7/1942 | Atkins | |
| 2,312,640 A | 3/1943 | Guilfoil | |
| 3,105,373 A | 10/1963 | De Georges | |
| 3,403,714 A | 10/1968 | Hulm | |
| 3,483,908 A | 12/1969 | Donovan | |
| 3,583,853 A | 6/1971 | Schramm | |
| 3,797,990 A | 3/1974 | Ogers | |
| 3,918,888 A | 11/1975 | Clarke | |
| D247,635 S | 3/1978 | Maxwell | |
| 4,755,135 A | 7/1988 | Kwok | |
| 5,690,484 A | 11/1997 | Leonard | |
| 6,428,310 B1 * | 8/2002 | Nicholas | C11C 5/023 249/94 |
| 6,793,484 B2 | 9/2004 | Pesu | |
| D507,667 S | 7/2005 | Aucoin | |
| 8,348,662 B2 | 1/2013 | Decker | |
| 8,529,974 B2 * | 9/2013 | Ortiz | B65D 77/0493 426/115 |

(Continued)

*Primary Examiner* — Vivek K Shirsat
(74) *Attorney, Agent, or Firm* — Jeffery M. Lillywhite; Kimball Anderson

(57) ABSTRACT

A candle assembly includes a candle holder configured to hold a candle block. The candle holder has an opening, a wall and base. The wall is attached around the periphery of the base. The opening is positioned opposite the base. The base includes an aperture extending through the thickness of the base. An inner liner fits against the wall of candle holder and has an exposed portion across the aperture to define a button. A rim is attached to the wall opposite the base and extends into the candle holder at least the thickness of the inner liner to secure the inner liner within the candle holder. A circular ring having a central opening wraps around the inner liner, holding the inner liner within the candle holder. A wick stabilizer rests on top of a wick tab and both sit inside of the candle block, stabilizing the candle block.

19 Claims, 8 Drawing Sheets

(56) References Cited

U.S. PATENT DOCUMENTS

| | | | | |
|---|---|---|---|---|
| 9,341,365 | B2 | 5/2016 | Gan | |
| 9,599,330 | B2 | 3/2017 | Rutan | |
| 10,371,372 | B2 | 8/2019 | Von Zell | |
| D870,923 | S | 12/2019 | Panagiotis | |
| 10,696,432 | B2 | 6/2020 | Levy | |
| D919,840 | S | 5/2021 | Sablowski | |
| 11,313,552 | B2 | 4/2022 | Wong | |
| 2003/0064340 | A1 | 4/2003 | Pappas | |
| 2004/0029061 | A1 | 2/2004 | Dibnah | |
| 2015/0153039 | A1 | 6/2015 | Cremer | |
| 2017/0275559 | A1 * | 9/2017 | Van Dorsser | F23D 3/24 |
| 2022/0316695 | A1 | 10/2022 | Pasteris | |

* cited by examiner

REUSABLE WAX CANDLE HOLDER AND METHODS

CROSS-REFERENCE TO RELATED APPLICATIONS

This application claims the benefit of U.S. patent application Ser. No. 17/579,588, entitled "Reusable Wax Candle Holder and Method," filed Jan. 19, 2022, which claims the benefit of U.S. Provisional Patent Application Ser. No. 63/139,303, filed Jan. 19, 2021, which are incorporated herein by reference.

TECHNICAL FIELD

The present disclosure generally relates to candle holders for wax candles and, more particularly, to reusable wax candle holder designed for multiple uses.

BACKGROUND

A scented candle has an ignitable wick embedded in wax. The candle illuminates and releases fragrances into a room when lit. A flame is used to light the wick and burn the candle, which melts and vaporizes a small amount of the wax. Dyes and fragrances can be mixed in with the wax for varying aesthetic appeal, and for releasing seasonal, therapeutic and pleasing scents. Glass jars are typically used as a candle holder for scented candles.

As the wax melts, the candle burns the vaporized wax as fuel and the volume of wax in the candle holder decreases. A portion of the wick that is not emitting the vaporized wax is consumed in the flame. The length of the wick decreases with the burn to an exposed portion where the vaporized wax is being burned. A wick is typically fixed to the bottom of a candle holder by using a sticker, or a small amount of wax or adhesive to fix the wick to the bottom of the container before pouring in the melted wax such as a wick sticker or tab, to adhere the wick to the container. As the wick burns, the candle shrinks in height as the wax melts away. Because the wick is adhered to the container, the remaining wax and wick are difficult to remove so most candle holders are thrown away after the wax is burned to the bottom of the candle holder or the scent is no longer enjoyed. The jars are typically thrown away after a single use.

The jars are cleaned by placing the used candle jar, with leftover wax residue, in a pot of boiling water or hot boiling water is poured into the container itself. Cleaning a glass jar or a container made of a brittle material, can be dangerous since the container or jar may shatter due to the rapid temperature change. From there, the remaining wax will slowly melt and float to the top of the water and then it can be removed and thrown away once it has hardened at the surface of the water. Once the wax melts, the user must take a paper napkin or towel and wipe the inside of the jar. In another method, the candle jar can be placed in a freezer to harden the wax. Once the wax freezes, the user can take a butter knife and chip off the frozen wax.

The liquid wax in the jar is hot and can cause skin burns. Glass jars can crack by thermal shock from the candle flame. In particular, when the candle burns down to the end of the wick, the heat from the flame may be hot enough to crack the glass.

The subject matter claimed herein is not limited to embodiments that solve any disadvantages or that operate only in environments such as those described above. Rather, this background is only provided to illustrate one exemplary technology area where some embodiments described herein may be practiced.

SUMMARY

There is a large amount of waste generated each day from used candle jars. In the present invention, the candle holder, or glass jar, includes a liner to help release the wax from the candle holder. With the liner placed in the candle holder, the wax residue is easily removed. A new wax block can be inserted into the candle holder.

In one aspect of the invention, a candle assembly includes a candle block made substantially of a wax and including at least one wick, a wick tab, and a wick stabilizer. The wick goes through the center of the wick tab and the center of a wick stabilizer on top of the wick tab. The wick tab and wick stabilizer are located inside of the candle block at the end that sits at the base of the candle holder. A candle holder has a cylindrical shape with an opening, a wall and base. The wall defines a continuous inside surface around the base. The base is positioned opposite the opening and includes an aperture extending through the thickness of the base. An inner liner is configured to fit tightly against the inside surface defined by the wall and rests across the entire base within the candle holder. The inner liner provides a barrier between the candle block and the candle holder. The inner liner may fit so that there is no space between the inner liner and the wall of the candle holder. The inner liner may also fit within the wall of the candle holder so that there is a space between the inner liner and wall of the candle holder, thereby allowing air to circulate in the space. The inner liner has a nodule that is sized to span over or fit within the aperture and through the thickness of the base to define a button. The button formed by the inner liner may be flush against the bottom of the candle holder or the button may protrude out from the aperture at the base of the candle holder. A rim is attached around the wall at the opening of the candle holder and configured to extend into the inner space of the candle holder to secure the inner liner within the candle holder.

In another aspect of the invention, a candle assembly includes a candle block as described herein, a candle holder having a cylindrical shape with an opening, a wall and base as described herein, an inner liner as described herein, and a circular ring having a central opening and the circular ring rests around the circumference of the inner liner. The candle assembly includes a candle holder configured to hold a candle block. The candle holder has an opening, a wall and base. The wall is attached around the periphery of the base. The opening is positioned opposite the base. The base includes an aperture extending through the thickness of the base. An inner liner is placed in the candle holder and configured to fit tightly against the wall and to provide a watertight container for the candle block. The inner liner has an exposed portion across the aperture to define a button. A ridge is positioned on the wall or circular ring opposite the base and configured to extend into the candle holder at least the thickness of the inner liner and to secure the inner liner within the candle holder. The circular ring may have threading, an adhesive or a latched connection so that it fastens to the candle holder. When connected to the candle holder, the outside of circular ring is flush with the outer wall of the candle holder to form one continuous smooth surface. The circular ring may rest on the rim at the top of the candle holder so that the circular ring fits over the top of the inner liner, thereby preventing the inner lining from slipping from the opening of candle holder. The circular ring may rest at the base of the candle holder so that the bottom of inner liner rests on the circular ring, thereby preventing the inner liner from slipping from the base of the candle holder. Other locations for the circular ring may also be contemplated, including when the circular ring rests at a mid-point of the candle holder between the base and opening, or at any height between the base and opening of the candle holder, thereby dividing the candle holder into portion found above the circular ring including the opening of the candle holder and a bottom portion found below the circular ring including the base of the candle holder. The circular ring secures the inner liner, thereby preventing the inner liner from slipping outside the candle holder.

In another aspect of the invention, a candle assembly includes a candle holder configured to hold a candle block. The candle holder has an opening, a wall and base. The wall is attached around the periphery of the base. The opening is positioned opposite the base. The base includes an aperture extending through the thickness of the base. An inner liner is placed in the candle holder and configured to fit against the wall of the candle holder to provide a container for the candle block. The inner liner provides a barrier between the candle block and the candle holder. The inner liner may fit tightly against the wall of the candle holder so that there is no space between the inner liner and the wall of the candle holder. The inner liner may also fit within the wall of the candle holder so that there is a space between the inner liner and wall of the candle holder, thereby allowing air to circulate in the space. The inner liner has a nodule that is sized to fit within and through the aperture of the base to define a button. The button formed by the inner liner may be flush with the outer surface of the base of the candle holder or the button may protrude out from the aperture at the base of the candle holder. A user may push this button to remove the inner liner from the candle holder and discard any remaining wax left in the inner liner. Upon removal of the remaining wax, the clean inner liner can be reinserted into the candle holder and a new candle block inserted into the inner liner. The inner liner may also be secured to the top of the candle holder with an adhesive, such as tape, glue, hot melt, epoxy adhesives, polyurethane adhesives, or the like.

This summary is provided to introduce a selection of concepts in a simplified form that are further described below in the Detailed Description. This summary is not intended to identify key features or essential features of the claimed subject matter, nor is it intended to be used as an aid in determining the scope of the claimed subject matter.

Additional features and advantages will be set forth in the description which follows, and in part will be obvious from the description, or may be learned by the practice of the teachings herein. Features and advantages of the invention may be realized and obtained by means of the instruments and combinations particularly pointed out in the appended claims. Features of the present invention will become more fully apparent from the following description and appended claims, or may be learned by the practice of the invention as set forth hereinafter.

BRIEF DESCRIPTION OF THE DRAWINGS

In order to describe the manner in which the advantages and features of the invention can be obtained, a more particular description of the invention briefly described above will be rendered by reference to specific embodiments thereof which are illustrated in the appended drawings. Understanding that these drawings depict only typical embodiments of the invention and are not therefore to be considered to be limiting of its scope, the invention will be described and explained with additional specificity and detail through the use of the accompanying drawings in which.

DETAILED DESCRIPTION OF THE VARIOUS EMBODIMENTS

Figure 1:
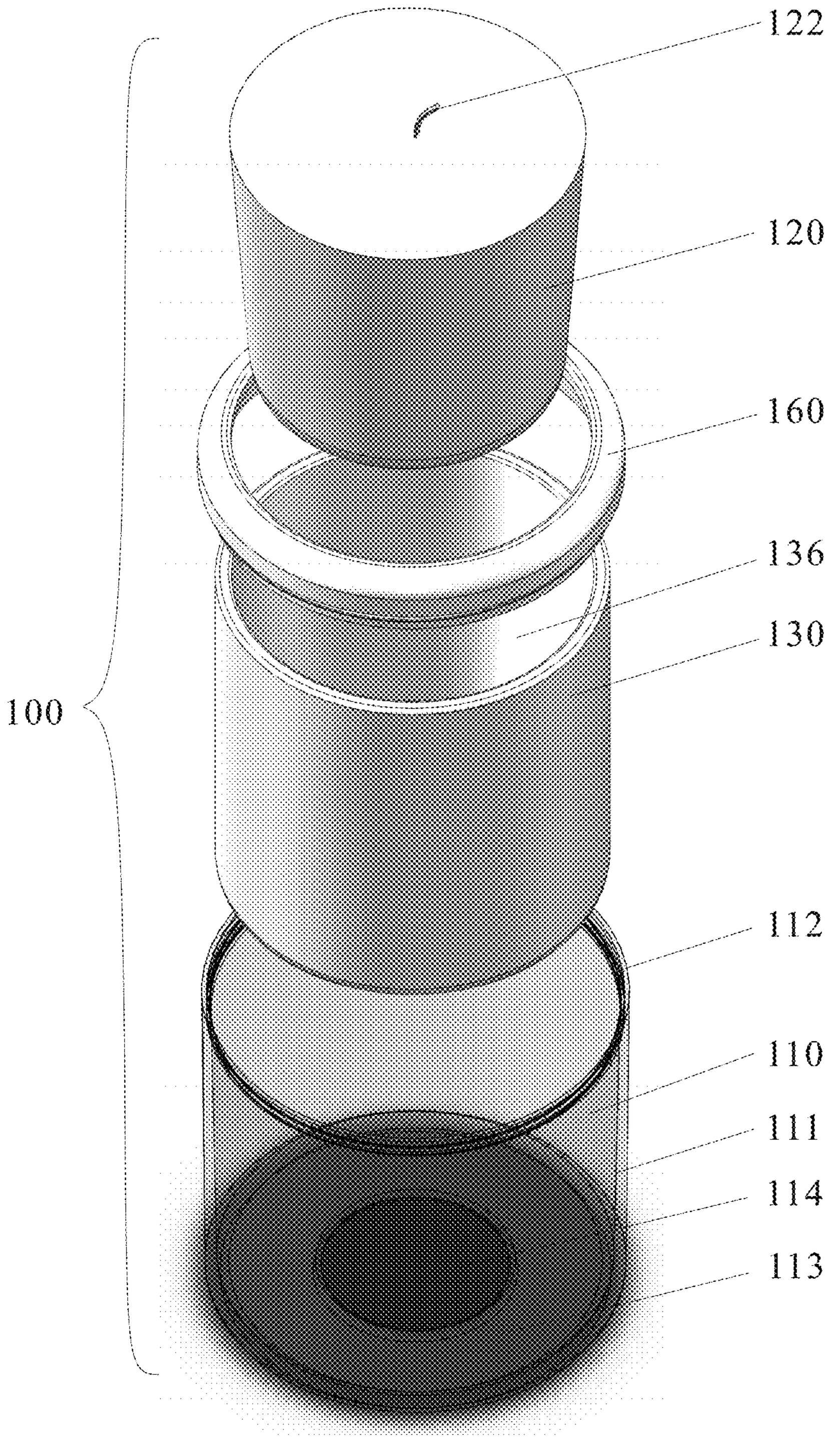
FIG. 1 is an assembly drawing of the candle showing various components in accordance with an embodiment of the present invention.
Figure 2:
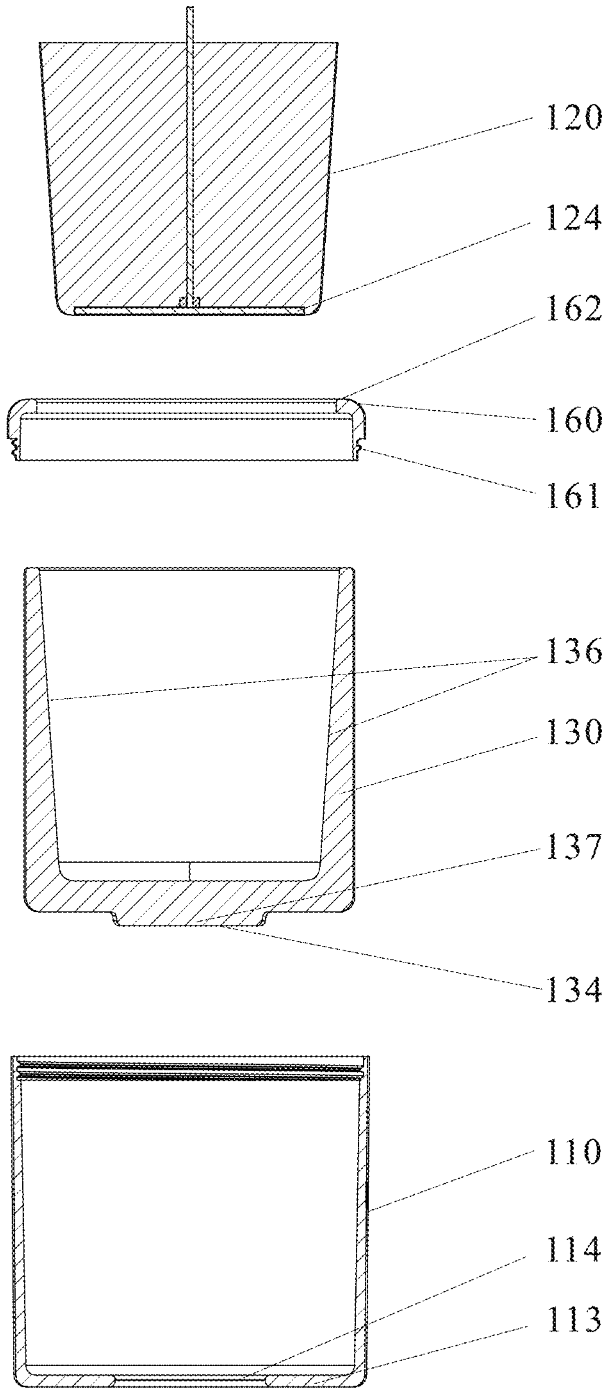
FIG. 2 is a cross-sectional view of the various components of the present invention in which the components are disassembled.
Figure 3:
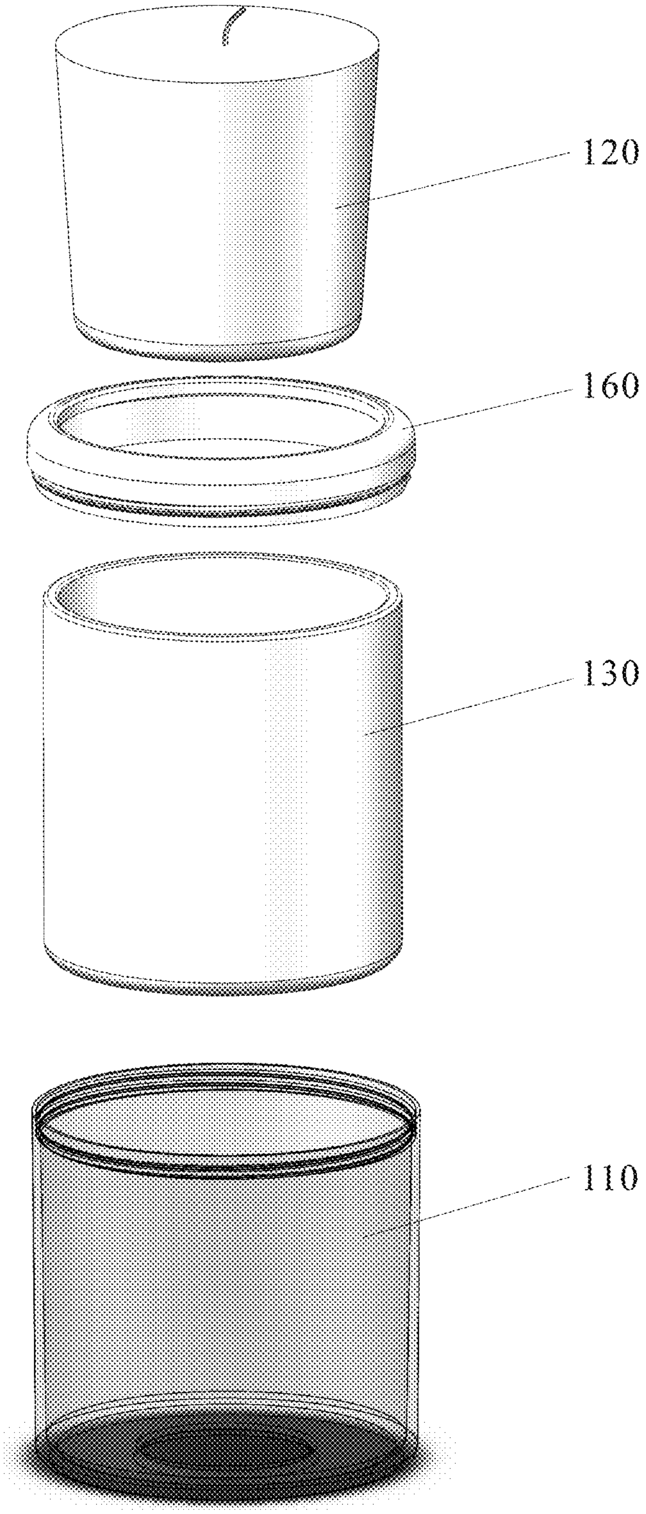
FIG. 3 is an isometric assembly view of the various components of the candle in accordance with the embodiments of the present invention.
Figure 4:
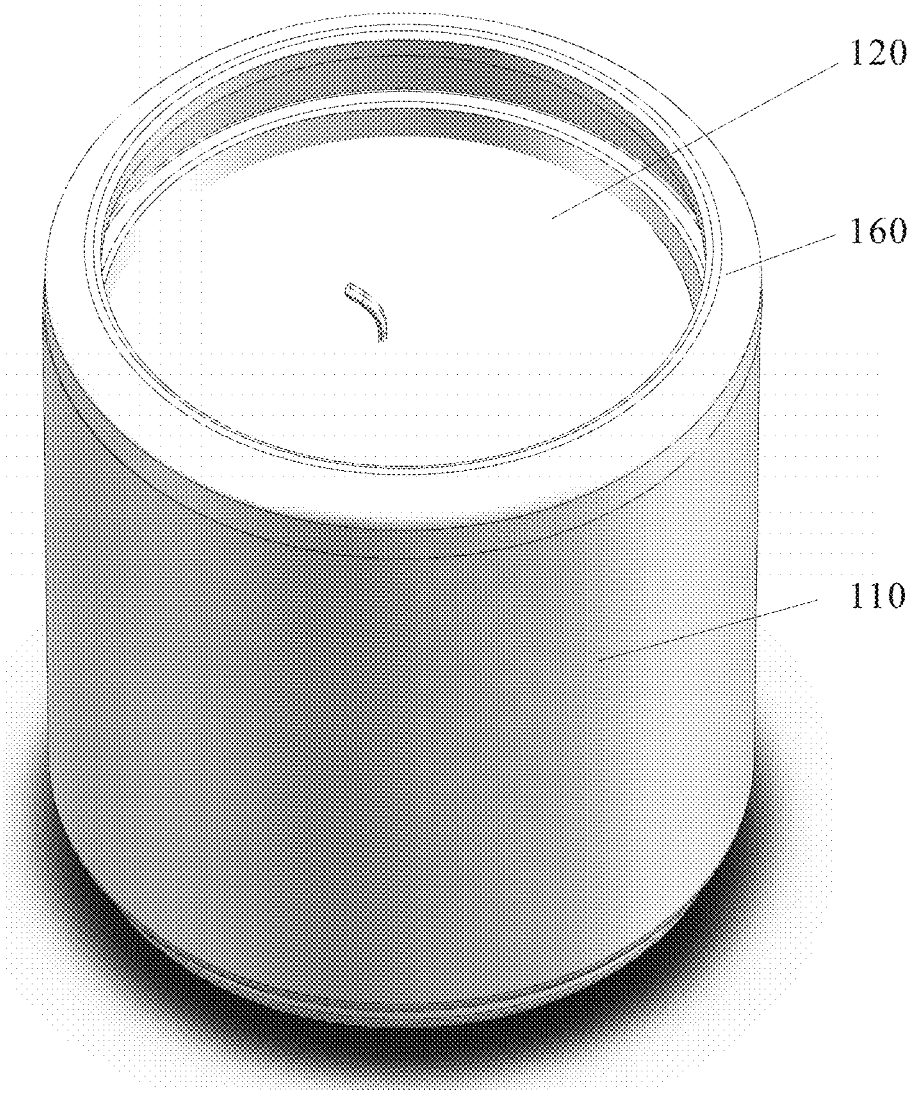
FIG. 4 is an isometric view of a candle in accordance with an embodiment of the present invention having the circular ring at the top of the candle holder.
Figure 5:
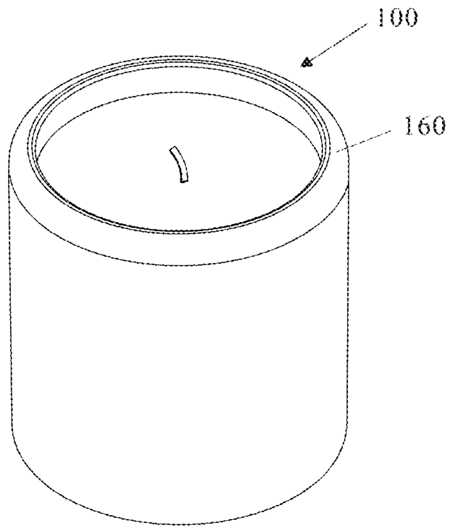
FIG. 5 is an isometric view of a candle in accordance with an embodiment of the present invention having the circular ring at the top of the candle holder
Figure 6:
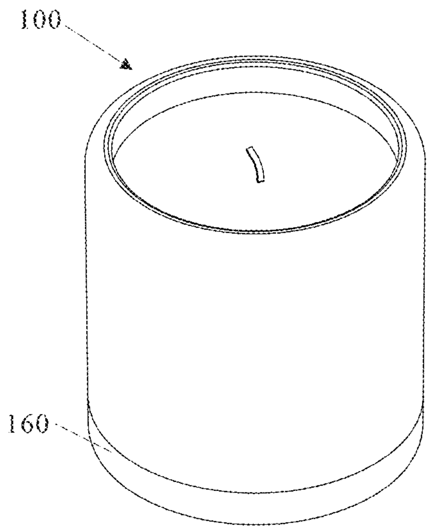
FIG. 6 is an isometric view of a candle in accordance with an embodiment of the present invention having the circular ring at the bottom of the candle holder
Figure 7:
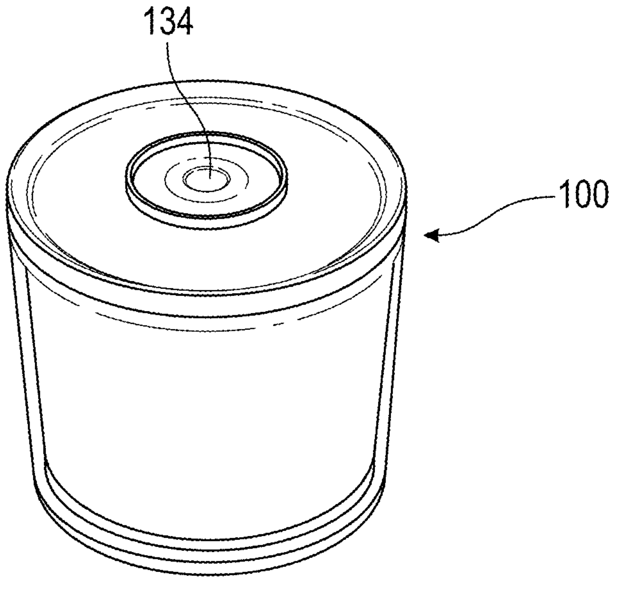
FIG. 7 is an isometric, bottom view of the candle illustrated in FIG. 5 in a closed position and the circular ring rests at the top of the candle holder.

The present devices and methods include various embodiments of reusable candle holder for a candle block, such as a wax candle. The present invention reduces the time required to reuse jars after use of a candle or to replace another candle in the candle holder. The candle holders are designed to be used and reused in a much safer way than conventional candles.

As illustrated in FIGS. 1-11 a candle assembly 100 is provided with a candle holder 110 designed to hold a candle block 120. The candle block 120 is made substantially of a wax and includes at least one wick 122. The candle block 120 is inserted into a candle holder 110 made from a rigid material, such as glass, metal, plastic or other material used to hold candle wax. The candle holder 110 can have a cylindrical shape with wall 111, a rim 112, and a base 113, and can be shaped like a jar.

The candle holder 110 has an opening in the top to allow the candle to burn within the candle holder 110. The base 113 can include an aperture 114 that extends through the thickness of the base 113. The inside surface of the wall 111 and the base 113 defines an inner space. The wall 111 of the candle holder 110 defines a continuous inside surface around the base 113. The base 113 is positioned opposite the opening and includes an aperture extending through the thickness of the base 113. The rim 112 can be attached around the wall 111 of the candle holder 110 and can be configured to extend into the inner space of the candle holder 110 to secure an inner liner 130 within the candle holder 110.

The candle assembly 100 can include the candle holder 110 that is configured to hold a candle block 120. The wall 111 can be attached around the periphery of the base 113. The opening is positioned opposite the base 113. The base 113 includes an aperture extending through the thickness of the base 113. In one embodiment of the invention with the candle holder 110 having an outer diameter of about 89 mm, the aperture 114 may be sized between about 22 mm and about 78 mm in diameter, and preferably about 35 mm and 40 mm in diameter. The ratio between the aperture 114 and the base 113 of the candle holder can be sized between about 5% of the area of the base 113 and about 80% of the base 113, and preferably about 15% to about 20% of the area of the base 113.

An inner liner 130 can be fixed to or removably placed in the candle holder 110. The inner liner 130 provides a barrier between the candle block 120 and the candle holder 110. The inner liner 130 may configured to fit tightly against the inside surface of the wall 111 of the candle holder 110 to provide a watertight container for the candle block 120 so that there is no space between the inner liner 130 and the inside surface of the wall 111. The inner liner 130 may also be configured so that there is a space 116 between the inner liner 130 and inner surface of wall 111 of the candle holder 110, thereby allowing air to circulate in the space 116 and provide an additional layer of insulation between the candle block 120 and the candle holder 110, to reduce heat transferring between the candle block 120 and the candle holder 110. In an embodiment of the invention where the outside diameter of the candle holder 110 is about 89 mm, the space 116 may be sized between about 5 mm and about 1 mm, and preferably about 2 mm. The space 116 allows heat from a lit candle block 120 to dissipate more readily so that the candle holder 110 does not absorb as much heat, thereby allowing a user to handle the candle holder 110. The inner liner 130 is made of any material that reduces the heat transfer through the material and helps insulate the candle holder 110 from the heat of the lit candle block 120. The aperture 114, as discussed above, may also be sized to encompass a substantial portion of the diameter of the base 113, and up to a diameter substantially equal to the inside diameter of the inner liner 130 if the candle assembly 100 includes a space 116 between the inner liner 130 and the inside wall of the candle holder 110.

The inner liner 130 can have an exposed portion across the aperture 114 to define a button 134. The button 134 may be flush with, or sized to not extend below, the base 113 of the candle holder 110. The button 134 may also protrude slightly beyond the base 113 of the candle holder 110. When the button 134 is sized to extend below the base 113, the button 134 provides a friction surface and functions as a grip to prevent the candle assembly 100 from sliding on a surface. The button 134 may extend through the aperture 114 and below the base 113 to provide a friction surface along a portion of the base 113. A user may push the button 134 to remove the inner liner 130 from the candle holder 110 then discard any remaining wax left in the inner liner 130. Upon removal of the remaining wax, the inner liner 130 can be reinserted into the candle holder 110 and a new candle block 120 may be placed into the inner liner 130. The inner liner 130 may be secured to the top of the candle holder with an adhesive, such as tape, glue, hot melt, epoxy adhesives, polyurethane adhesives, or the like. When the button 134 is pushed, the inner liner 130 may remain in the candle holder 110 due to a circular ring 160, as described herein, or the adhesive at the top of the candle holder 110. There may also be no adhesive so that the inner liner 130 comes out of the candle holder 110 entirely when the button 134 is pushed.

A rim 112 can be positioned on the wall 111 opposite the base 113. The rim 112 or circular ring 160, discussed below, can include a ridge 162 configured to extend into the candle holder 110 at least the thickness of the inner liner 130 and to secure the inner liner 130 within the candle holder 110. The circular ring 160 can be attached to the candle holder 110 by threading the circular ring 160 onto the rim 112 of the candle holder 110 to provide a snug fit between the ridge 162 and the inner liner 130 and hold to the inner liner 130 within the candle holder 110.

The candle holder 110 can include an inner liner 130, for example, made from a material such as silicon, polytetrafluoroethylene, polyimide, PEEK, PPS, nylon, acetal, polyester, or other non-stick plastics, rubber, or other non-stick, flexible materials. The inner liner 130 can be designed a separate insert for the candle holder 110 or integrated into the wall 111 of the candle holder 110. The aperture 114 in the base 113 of the candle holder 110 is configured to expose a portion 132 of the inner liner 130 at the aperture 114. The exposed portion 132 of the inner liner 130 is arranged to extend through the aperture 114 and define a button 134. The button 134 or portion 132 that extends through the aperture 114 is made from a flexible material to allow a user to push the button 134 and apply pressure to the bottom of the candle block 120 to release the candle block 120 from the candle holder 110. To remove the candle block 120, whether spent or switching out a candle scent, the user can press the button 134 to apply pressure to the candle block 120 and release the tension between the inner surfaces 136 of the inner liner 130 and the remaining wax residue or wax block of the candle block 120 to discharge the hardened wax.

The inner liner 130 is configured to fit against the inside surface defined by the wall 111 and across the entire base 113 within the candle holder 110. The inner liner 130 provides a barrier between the candle block 120 and the candle holder 110. The inner liner 130 has a nodule sized to fit within the aperture 114 and through the thickness of the base 113 to define a button 134.

The inner liner 130 may be configured to fit against the inside surface defined by the wall 111 and across the entire base 113 within the candle holder 110 so that there is a space 116 between the inner liner 130 and inner surface of wall 111 of the candle holder 110, thereby allowing air to circulate in the space 116. The space 116 allows the heat from the lit candle block 120 to dissipate more readily so that the candle holder 110 does not absorb as much heat, thereby allowing a user to more easily touch the candle holder 110.

The inner liner 130 may be configured to fit tightly against the inner surface defined by the wall 111 and adhered to the wall 111 of the candle holder 110 using an adhesive, such as epoxy adhesives, polyurethane adhesives, and polyurethane adhesives. The inner liner 130 may also be formed into the candle holder 110 using a mold, spray or dipped coating, or other methods known to form an inner wall within a container. Further, the inner liner 130 may be inserted into the candle holder 110 and designed to have a tight fit to not require the inner liner 130 to be adhered to the wall 111 of the candle holder 110. In this embodiment, the inner liner 130 is designed to remain inside the candle holder 110 when a user presses the button 134 to release the candle block 120. When the inner liner 130 is made from a rigid material or is firmly attached to the wall 111 of the candle holder 110, the portion 132 placed over the aperture 114 should be made from a pliable material to allow the button 134 to be pressed against the candle block 120 to move the candle block 120 sufficiently to release the tension between the wall 111 and the candle block 120. In another embodiment, the inner liner 130 may be secured to the top of the candle holder 110 with an adhesive, such as tape, glue, hot melt, epoxy adhesives, polyurethane adhesives, or the like. In another embodiment, the inner liner 130 may be inserted into the candle holder 110 so that when the button 134 is pushed, the inner liner 130 comes out of the candle holder 110 entirely.

In another aspect of the invention, the inner liner 130 is structured to fit tightly against the wall 111 of the candle holder 110. The tight fit connection secures the inner liner 130 sufficiently to secure the inner liner against the wall 111 of the candle holder 110 and prevent the inner liner 130 from disassembling from the candle holder 110 when the button 134 is pressed against the candle block 120. The inner liner 130 is not required to be a removable piece and may be fixed inside when the candle block 120 is replaced. A circular ring 160 that may also include a ridge 162 that is attached to the rim 112 of the wall 111 and is configured to hold in the inner liner 130 within the candle holder 110. The ridge 162 may be formed as a continuous piece of the wall 111 or a separate piece that is affixed to the wall 111, such as the circular ring 160, discussed below. The ridge 162 is configured to extend within the inner space of the candle holder 110 and sized to cover the thickness of the inner liner 130. The circular ring 160 may be affixed to the wall 111 using an adhesive, a snap fit connection, threaded connection, or other methods know to affix two different materials together.

The inner liner 130 may have a cylindrical, conical, tapered conical, cubic, or other shape with straight walls. The inner liner 130 can have an outer surface that is configured to match the inside of the wall 111 of the candle holder 110. The inner surface 136 of the inner liner 130 can have a tapered conical shape that tapers from a thin wall at the top to a thicker wall at the bottom to enhance the ease of removing the candle block 120. The inner liner 130 can provide a non-stick surface to allow the wax, in liquid, solid or semi-solid form to be removed or replaced from the candle holder 110 at any stage of use, whether at the beginning, middle or end of the use of the candle block. Preferably, the used wax is removed in a solid state to prevent possible burns to the user. The inner liner 130 can have a nodule 137 at the bottom surface 138 that is configured to fit within at least a portion of the aperture 114 of the candle holder 110 and define the button 134. The inner liner 130 may include a nodule 137 that is sized to fit within the aperture 114 and through the thickness of the base 113 to define the button 134. The button 134 may be sized to fit flush against a bottom of the candle holder 110 or protrude out from the aperture 114 from the base 113 of the candle holder 110. The nodule 137 can extend down into the aperture 114 a distance that is substantially equal to the thickness of the base 113 at the aperture 114 and allow the user to access the button 134. The distance may be a portion or the entire distance of the thickness of the aperture 114. The candle block 120 can be replaced to switch the scented candle wax by pushing the button 134 on the bottom of the candle holder 110 to remove the old wax and replace with a new candle block 120 inside the candle holder 110. The new candle block can be a wax block that is sized to fit within the inner liner 130. The new candle block 120 is placed in the candle holder 110 and may be used until spent, where the wax is discharged and replaced again. The remaining wax residue or remaining candle block can be replaced at any time.

Figure 8:
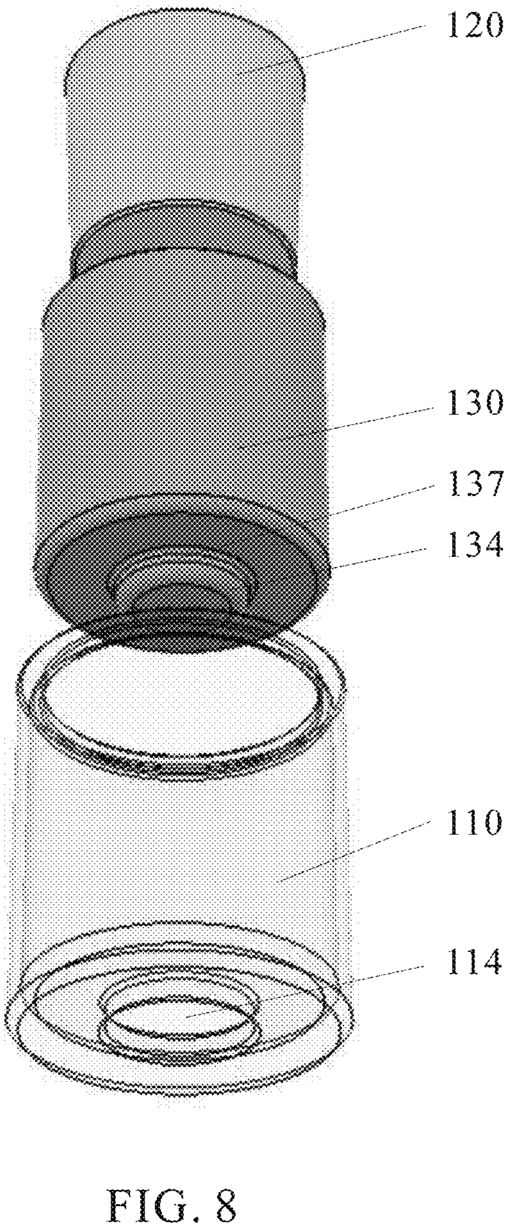
FIG. 8 is a bottom view of a candle assembly illustrating the candle holder, inner liner and candle block.
Figure 9:
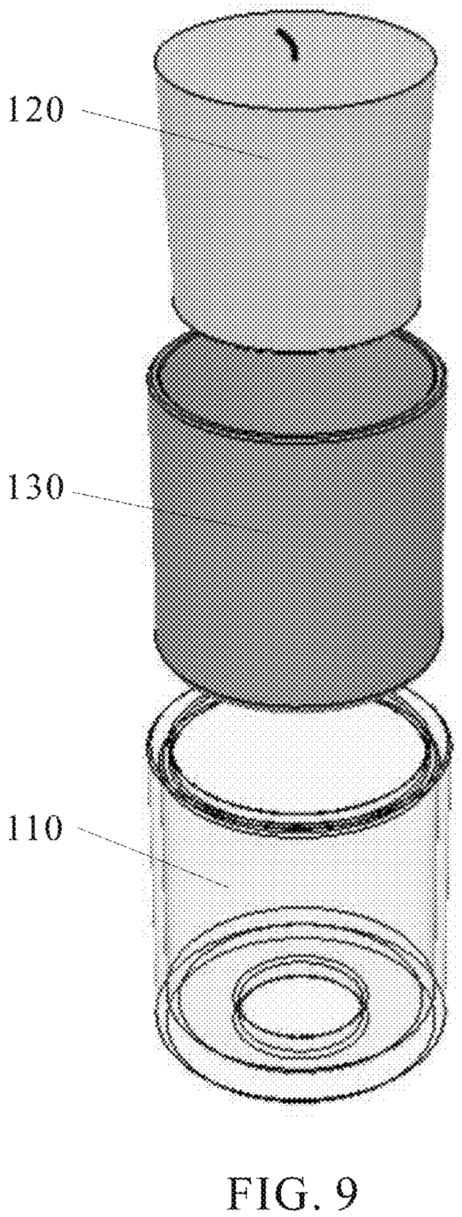
FIG. 9 is a top view of a candle assembly illustrating the candle holder, inner liner and candle block.
Figure 10:
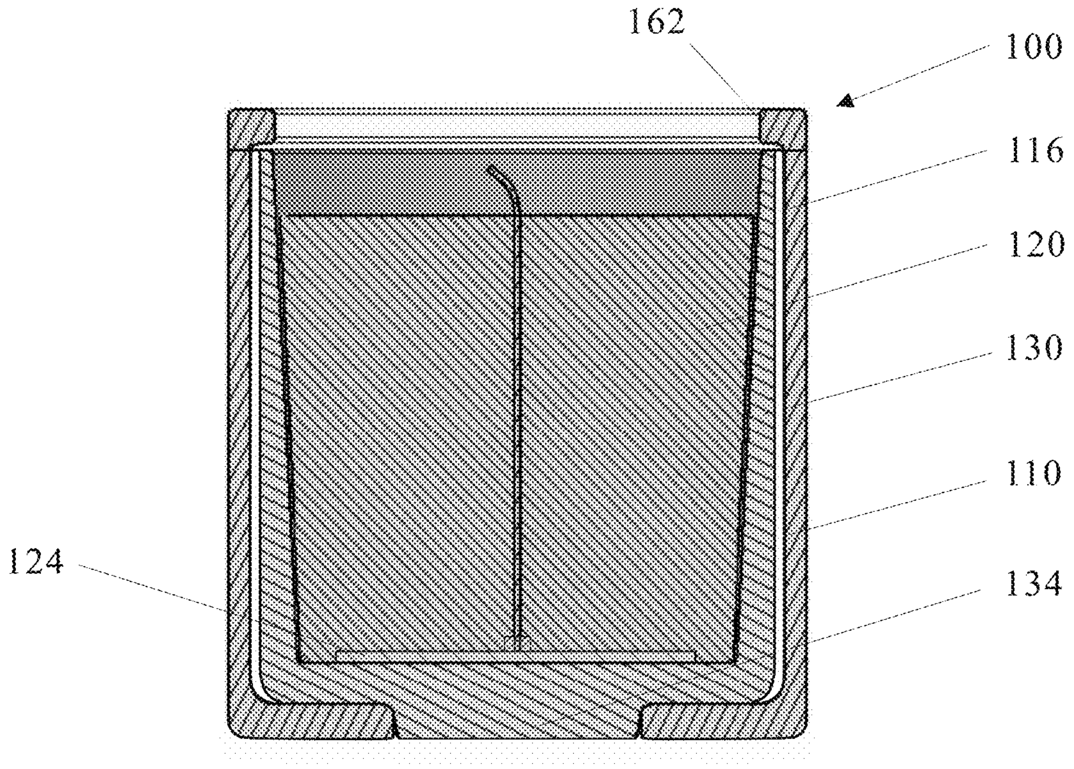
FIG. 10 is a cross-sectional view of a candle assembly in accordance with an embodiment of the present invention.
Figure 11:
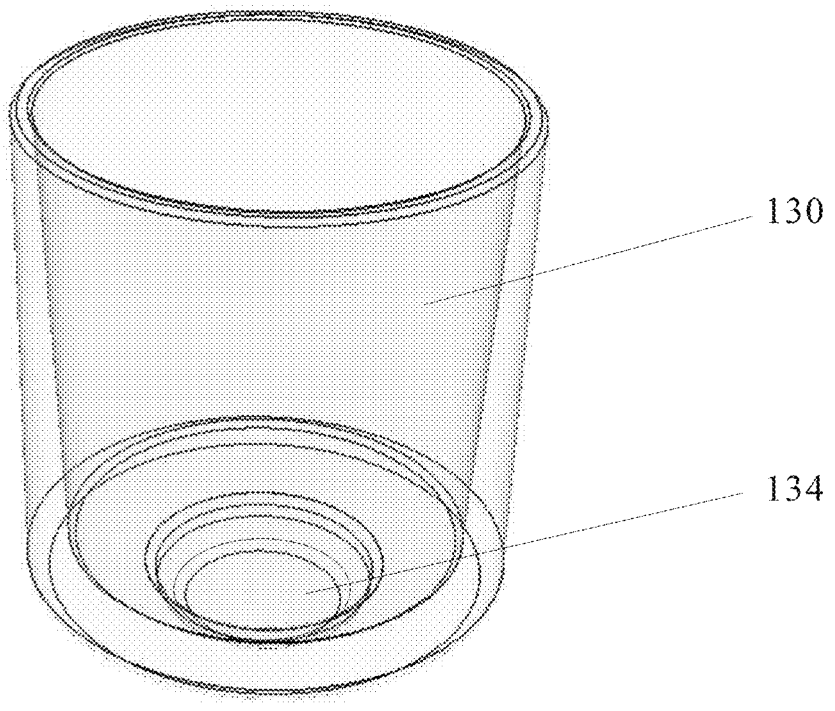
FIG. 11 is an isometric view of an inner liner in accordance with an embodiment of the present invention.

As shown in FIG. 8-9, the inner liner 130 may also include a hollow ring around the aperture 114 to provide flexibility at the point of release and ease of pushing the button 134. The aperture 114 at the bottom of the candle holder 110 allows the users to discharge the candle block after use without messy clean-up and requiring the inner liner 130 to be separated from the candle holder 110. In the present invention, the inner liner 130 is not required to be removed when replacing the candle block 120. However, the inner liner 130 may be removed from the candle holder 110 by removing the circular ring 160 and pulling out the inner liner 130 to allow the user to clean any scent residue, soot, or wax buildup. The circular ring 160 provides an easy way to care for the candle assembly 100 by allowing the circular ring 160 to be removed to access the inner liner 130 for disassembly and reinserting the inner liner 130 into the candle holder 110.

In another aspect of the invention, the candle 100 includes a circular ring 160 having a central opening large enough so that the circular ring 160 wraps around the circumference of the inner liner 130. The circular ring 160 may rest on either end of the inner liner 130 so that it rests along the rim 112 at the opening in the top of the candle holder 110 or it rests along the base 113 of the candle holder 110. The circular ring 160 can also be adjusted to rest at various heights between the base 113 and opening of the candle holder 110, thereby dividing the candle holder 110 into two separate portions. The circular ring 160 may be connected to the candle holder 110 through different means such as through using an adhesive, a snap fit connection, threaded connection, or other methods know to affix two different materials together. When connected to the candle holder 110, the outside of circular ring 160 is flush with the outer wall of the candle holder so that one continuous smooth surface is formed. The circular ring 160 may connect to the candle holder 110 through threading so that circular disk 160 tightens to the rim 112 of the candle holder 110. One end of the circular ring 160 has a ridge 161 around the rim that extends within the inner space of the candle holder 110 and is sized to cover the thickness of the inner liner 130. When the button 134 of the inner liner 130 is pushed, the inner liner 130 pushes against the ridge 161, allowing the candle block 120 to be expelled from the candle holder more easily.

The circular ring 160 may be made of various materials or coated with a material so that the circular ring 160 is flame-resistant, meaning that the circular ring 160 will not ignite when exposed to the flame on the wick 122 and the heat from the flame. The circular ring 160 may be made of metals, such as aluminum or an aluminum-based metal alloy, or polycarbonate plastic or it may be made by stamping thin metal sheets. In another embodiment of the invention, the circular ring 160 may be made of wood, or other decorative materials that are not flammable when the material is coated with a flame-resistant coating. The overall height and thickness of the circular ring 160 may vary. The circular disk 160 is placed so it rests outside of the inner liner 130 and forms a continuous surface with outside wall of the candle holder 110.

The candle block 120 is manufactured by placing wax chunks or shavings in a container or double boiler. The candle block 120 cannot be placed directly on the heat or the wax will catch fire or evaporate. The wax is heated until completely melted. A thermometer may be used melt the wax at proper temperature. Paraffin wax should be melted at temperatures between 122 and 140° F. (50 and 60° C.). Soy wax should be melted at temperatures between 170 and 180 degrees (76.6 and 82.2° C.). Beeswax should be melted at about a temperature of 145 degrees (62.7° C.) and should not exceed 175 degrees (79.4° C.). The wax is placed in a mold to form a candle block 120 that is designed to fit within the inner liner 130.

A fragrance can be added to the melted wax. The fragrance can be an essential oil, combination of fragrances or other scent additive. The fragrance is mixed with the wax until completely stirred in.

A color can also be added to the wax. The coloring should be an oil-based dye. Additional colors may be added to the melted wax to achieve the right consistency and to achieve a certain final desired color.

At least one wick 122 is placed in the center of the candle mold. The wick 122 can be placed in the center of the candle mold or at a desired location, or desired locations if placing more than one wick in the candle 100. The wick 122 should be sized to extend above the top of the candle surface.

The mold is shaped to fit into the inner liner 130 of the candle holder 110. The wax is poured into the mold and cooled. The wax should be cooled for about 24 hours for paraffin waxes. Soy wax generally takes about 4 to 5 hours to cool and Beeswax candles generally takes about 6 hours to cool. Longer cooling times are better and generally help the candles set up.

The wax is removed from the mold and the wick is trimmed to an acceptable starting length for the candle wicks. The length of the initial wick is sized to provide a proper burn of the flame when lit. If the wick 122 is too long, the flame may be too large and release black smoke or soot.

Figure 12:
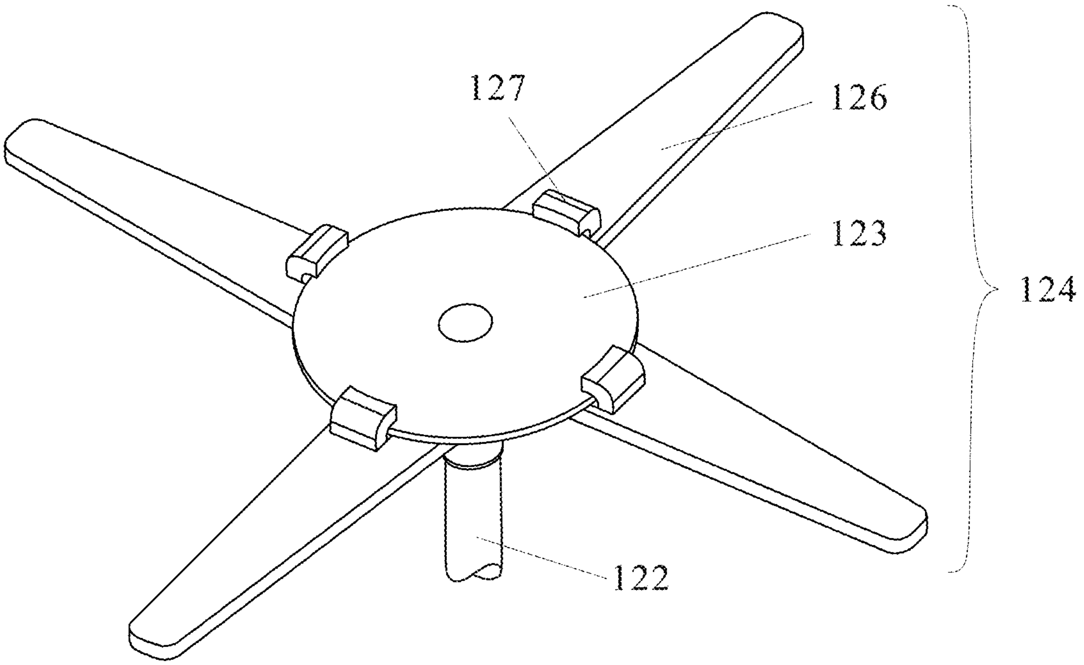
FIG. 12 is a bottom view of a wick assembly illustrating a wick, wick tab and a wick stabilizer.
Figure 13:
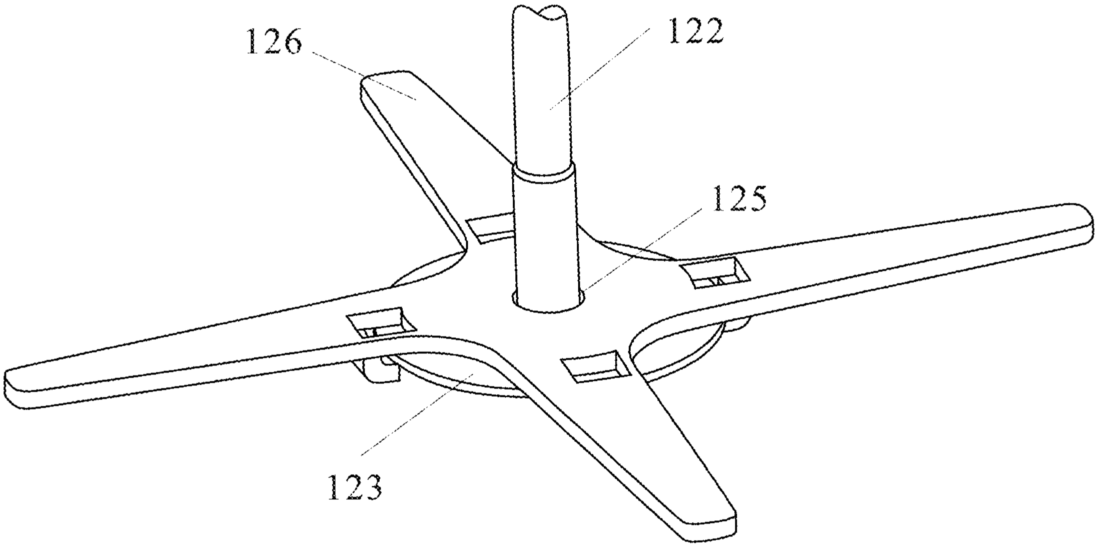
FIG. 13 is a top view of a wick assembly illustrating a wick, a wick tab and a wick stabilizer.

As shown in FIGS. 12-13, in another aspect of the invention, the wick 122 extends through the center of a wick tab 123, and the center of a wick stabilizer 124 that rests on top of the wick tab 123. The wick tab 123 and wick stabilizer 124 are attached and disposed inside of the candle block 120 and arranged at the base 113 of the candle holder 110 to hold the wick 122 in an upright and centered position throughout the entire burn cycle of the candle block, even when the candle wax is depleted. A sticker or paper may be placed on the bottom of the candle block 120 to cover the appearance of the wick tab 123. The wick stabilizer 124 includes a central portion 125 and one or more branch portions 126 that extend out from the central portion 125. Each of the branch portions 126 and central portion 125 are integrally formed, and each of the branch portions 126 may have a rectangular shape with a tapered end. Preferably, there are four branch portions 126 and each end of a branch portion 126 is sized to contact an outer edge of the candle block 120 while the other end of a branch portion 126 is connected to the central portion 125 to provide a support for the wick 122 and wick tab 123. The length of the branch portion 126 of the wick stabilizer 124 is sized to span the radius of the base of the candle block 120 yet is sized less than the radius of the candle block 120 to prevent the outer edges from protruding out from the candle block. The central portion 125 and the four branch portions 126 collaboratively form a support or stand for the wick 122, such as a four-point star as shown in FIG. 12 and FIG. 13. Furthermore, in other embodiments of the invention, the wick stabilizer 124 may be a two-point or multipoint configuration, such as a six-point star. Each of the branch portions 126 of the wick stabilizer 124 may also have an attachment mechanism, such as a latch 127 that secures the wick stabilizer 124 to the wick tab 123. The latch 127 fastens onto the wick tab 123, thereby securing the wick tab 123 snugly onto the wick stabilizer 124. The wick tab 123 and wick stabilizer 124 may be attached with an attachment mechanism, such as an adhesive, a snap fit connection, or other methods known to affix two different materials together. The attachment mechanism may also be configured to provide a substantially continuous smooth surface between the wick tab and the wick stabilizer along the length of the center of the wick tab to the outer wall of the candle holder. The wick stabilizer 124 can be configured to hold the wick tab 123 in the center of the candle holder 110 and to prevent the wick tab 123 from floating to a side of an outer wall of the candle holder 110.

The wick stabilizer 124 provides extra support for the wick 122 as the candle block 120 shrinks in height as it is burned and the wax melts away. Further, the wick stabilizer 124 prevents the candle block 120 from shifting laterally as the candle block 120 melts, reducing the risk of having the wick 122 contacting the inner liner 130 and keeping the wick 122 upright even as the wax surrounding the wick 122 burns very low. The wick stabilizer 124 may be made of various materials so long as it is flame-resistant, meaning that the wick stabilizer 124 will not ignite when exposed to the flame on the wick 122. The wick stabilizer 124 may be made of metals, ceramics, or plastics, such as polycarbonate plastic or a combination of materials, such as a thin plastic or metal sheet formed to fit around the wick tab 123.

The candle holder 110 can be manufactured from glass, tin, ceramic, aluminum or other material that is known to withstand the heat of a lit wick in a candle block 120. These and other reports can be generated depending on the need and information tracked as will be understood by one of ordinary skill in the art.

The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed is:

1. A candle assembly, comprising:

a candle block made substantially of a wax comprising at least one wick and a wick stabilizer;

a candle holder having a cylindrical shape with an opening, a rim, a wall and a base, the wall defining a continuous inside surface around the base and the rim defining an outer edge of the wall at the opening, the base positioned opposite the opening and including an aperture extending through the thickness of the base;

an inner liner configured to fit tightly against the inside surface defined by the wall and across the entire base within the candle holder, the inner liner providing a barrier between the candle block and the candle holder, the inner liner configured to span the aperture in the base to define a button; and a circular ring having a central opening large enough to wrap around the circumference of the inner liner to create a snug fit between the circular ring and the inner liner to hold the inner liner within the candle holder.

2. The candle assembly of claim 1, wherein the circular ring rests on an end of the inner liner closest to the base of the candle holder, on the rim located at the opening of the candle holder or in between the end of the inner liner closest to the base of the candle holder and the rim, wherein when the circular ring rests in between, the candle holder is divided into two separate portions.

3. The candle assembly of claim 1, wherein the circular ring is connected to the candle holder through an adhesive, a snap fit connection, a threaded connection, or other methods known to affix two different materials together, wherein the connection between the circular ring and the candle holder forms a continuous smooth surface between an outside of the circular ring and an outer wall of the candle holder.

4. The candle assembly of claim 1, wherein the inner liner includes a nodule sized to fit within the aperture and through the thickness of the base to define the button, wherein the button may be flush against a bottom of the candle holder or protrude out from the aperture from the base of the candle holder.

5. The candle assembly of claim 1, wherein the inner liner is sized to create a space between the wall of the candle holder and the inner liner.

6. The candle assembly of claim 5, wherein the space between the inner liner and the wall of the candle holder provides insulation to reduce transfer of heat between the candle block and the candle holder.

7. The candle assembly of claim 1, wherein the wick extends through a center of a wick tab and a center of the wick stabilizer, wherein the wick stabilizer rests on top of the wick tab; wherein the wick tab and the wick stabilizer rest inside of the candle block at the base of the candle holder, and wherein the wick stabilizer is configured to hold the wick in an upright and centered position in the candle holder throughout the entire burn cycle of the candle block.

8. The candle assembly of claim 7, wherein the wick stabilizer comprises a central portion and one or more branch portions extending out from the central portion and each of the branch portions and central portion are integrally formed, and each of the branch portions has a rectangular shape with a tapered end.

9. The candle assembly of claim 8, wherein there are four branch portions and each end of a branch portion contacts an outer edge of the candle block and the other end of each of a branch portion is connected to the central portion of the wick stabilizer, and wherein the central portion and the four branch portions collaboratively form a four-point star.

10. The candle assembly of claim 8, wherein each of the branch portions of the wick stabilizer comprises a latch or attachment mechanism to secure the wick stabilizer to the wick tab.

11. A candle assembly, comprising:

a candle holder wherein the candle holder is configured to hold a candle block and comprises an opening, a wall and a base, wherein the wall is attached around a periphery of the base, the opening is positioned opposite the base, and the base comprises an aperture extending through a thickness of the base;

an inner liner wherein the inner liner is placed in the candle holder, configured to provide a space between the inner liner and the wall to provide a container for the candle block and has an exposed portion across an aperture to define a button;

a circular ring having a central opening large enough to wrap around a circumference of the inner liner to create a snug fit between the circular ring and the inner liner, thereby holding the inner liner within the candle holder; and a wick stabilizer resting on top of a wick tab, wherein the wick tab and the wick stabilizer rest inside of the candle block at the base of the candle holder and configured for a wick of the candle block to go through a center of the wick tab and a center of the wick stabilizer, and wherein the wick stabilizer is configured to hold the wick in an upright and centered position in the candle holder throughout the entire burn cycle of the candle block.

12. The candle assembly of claim 11, wherein the circular ring rests on an end of the inner liner closest to the base of the candle holder, on the rim located at the opening of the candle holder or in between the end of the inner liner closest to the base of the candle holder and the rim, and wherein when the circular ring rests in between, the candle holder is divided into two separate portions.

13. The candle assembly of claim 11, wherein the wick stabilizer is connected to the wick tab with an attachment mechanism to prevent the wick tab from floating to a side of an outer wall of the candle holder.

14. The candle assembly of claim 11, wherein the wick stabilizer comprises a central portion and one or more branch portions extending out from the central portion and each of the branch portions and central portion are integrally formed, and each of the branch portions has a rectangular shape.

15. The candle assembly of claim 14, wherein there are four branch portions and each end of a branch portion contacts an outer edge of the candle block and the other end of each of a branch portion is connected to the central portion of the wick stabilizer, and wherein the central portion and the four branch portions collaboratively form a four-point star.

16. The candle assembly of claim 14, wherein each of the branch portions of the wick stabilizer comprises a latch or fastener to secure the wick stabilizer to the wick tab.

17. A candle assembly, comprising:

a candle block made substantially of a wax comprising at least one wick;

a candle holder having a cylindrical shape with an opening, a wall and a base, the wall defining a continuous inside surface around the base, the base positioned opposite the opening and including an aperture extending through the thickness of the base;

an inner liner configured to provide a space between the candle block and the inside surface of the wall of the candle holder, and fit snugly across the entire base within the candle holder, the inner liner providing a barrier between the candle block and the candle holder and has an exposed portion across an aperture to define a button; and a circular ring having a central opening large enough to wrap around a circumference of the inner liner to create a snug fit between the circular ring and the inner liner, thereby holding the inner liner within the candle holder.

18. The candle assembly of claim 17, wherein the inner liner includes a nodule sized to fit within the aperture and through the thickness of the base to define the button, wherein the button may be flush against a bottom of the candle holder or protrude out from the aperture from the base of the candle holder.

19. The candle assembly of claim 18, wherein the button is configured to extend through the aperture and below the candle base to provide a friction surface along a portion of the candle base.

* * * * *